US012764517B2

(12) United States Patent
Kweon

(10) Patent No.: US 12,764,517 B2
(45) Date of Patent: Oct. 13, 2026

(54) METHOD AND DEVICE FOR TRANSMITTING DATA OF ROAMING TERMINAL IN WIRELESS COMMUNICATION SYSTEM

(71) Applicant: Samsung Electronics Co., Ltd., Gyeonggi-do (KR)

(72) Inventor: Kisuk Kweon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 224 days.

(21) Appl. No.: 18/292,533

(22) PCT Filed: Aug. 5, 2022

(86) PCT No.: PCT/KR2022/011666

§ 371 (c)(1),
(2) Date: Jan. 26, 2024

(87) PCT Pub. No.: WO2023/014170

PCT Pub. Date: Feb. 9, 2023

(65) Prior Publication Data

US 2024/0259782 A1 Aug. 1, 2024

(30) Foreign Application Priority Data

Aug. 5, 2021 (KR) ........................ 10-2021-0103105

(51) Int. Cl.
*H04W 8/02* (2009.01)
*H04W 8/20* (2009.01)

(52) U.S. Cl.
CPC ............... *H04W 8/20* (2013.01); *H04W 8/02* (2013.01)

(58) Field of Classification Search
CPC ........................................................ H04W 8/20
USPC ........................................................ 455/432.1
See application file for complete search history.

(56) References Cited

U.S. PATENT DOCUMENTS 9,980,123 B2 * 5/2018 Mecklin .................. H04W 8/24
10,887,742 B2 * 1/2021 Jain .......................... H04L 67/34
11,153,785 B2 * 10/2021 Kweon ................. H04L 45/306
11,638,207 B2 * 4/2023 Baek ................... H04W 28/088 455/452.1
2018/0324652 A1 11/2018 Ryu et al.
2020/0146077 A1 * 5/2020 Li ......................... H04W 76/10

FOREIGN PATENT DOCUMENTS

CN 110691384 1/2020
KR 1020180055914 5/2018
(Continued)

OTHER PUBLICATIONS

PCT/ISA/210 Search Report dated Nov. 3, 2022, issued on PCT/KR2022/011666, pp. 8.
(Continued)

*Primary Examiner* — Qutbuddin Ghulamali
(74) *Attorney, Agent, or Firm* — The Farrell Law Firm, P.C.

(57) ABSTRACT

The present disclosure relates to a 5G or 6G communication system for supporting a higher data transmission rate and, more specifically, to a method for controlling transmission of non-Internet protocol (non-IP) address data of a roaming terminal in unified data management (UDM) of a wireless communication system.

20 Claims, 7 Drawing Sheets

(56) References Cited

FOREIGN PATENT DOCUMENTS

| | | |
|---|---|---|
| KR | 10-2020-0039412 | 4/2020 |
| WO | WO 2019/035637 | 2/2019 |

OTHER PUBLICATIONS

PCT/ISA/237 Written Opinion dated Nov. 3, 2022, issued on PCT/KR2022/011666, pp. 3.
3GPP TS 23.502 V17.1.0 (Jun. 2021), pp. 693.
Nokia, Nokia Shanghai Bell, "NIDD configuration correction", SA WG2 Meeting #145E S2-2104825 May 17-28, 2021 ; Elbonia (revision of S2-2104591), pp. 3.
Korean Office Action dated Aug. 14, 2026 issued in counterpart application No. 10-2021-0103105, 16 pages.

* cited by examiner

METHOD AND DEVICE FOR TRANSMITTING DATA OF ROAMING TERMINAL IN WIRELESS COMMUNICATION SYSTEM

PRIORITY

This application is a National Phase Entry of PCT International Application No. PCT/KR2022/011666, which was filed on Aug. 5, 2022, and claims priority to Korean Patent Application No. 10-2021-0103105, which was filed on Aug. 5, 2021, the entire content of each of which is incorporated herein by reference.

TECHNICAL FIELD

The disclosure relates to a method and device for transmitting data of a roaming terminal in a wireless communication system, and particularly to a method and device for transmitting non-Internet protocol (non-IP) address data.

BACKGROUND ART 5G mobile communication technology defines a wide frequency band to enable a fast transmission speed and new services, and may be implemented not only in a frequency ('sub 6 GHz') band of 6 GHz or less such as 3.5 GHz, but also in an ultra high frequency band ('above 6 GHz') called a mmWave such as 28 GHz and 39 GHz. Further, in the case of 6G mobile communication technology, which is referred to as a beyond 5G system, in order to achieve a transmission speed that is 50 times faster than that of 5G mobile communication technology and ultra-low latency reduced to 1/10 compared to that of 5G mobile communication technology, implementations in terahertz bands (e.g., such as 95 GHz to 3 terahertz (3 THz) band) are being considered.

In the early days of 5G mobile communication technology, with the goal of satisfying the service support and performance requirements for an enhanced mobile broadband (eMBB), ultra-reliable low-latency communications (URLLC), and massive machine-type communications (mMTC), standardization has been carried out for beamforming and massive MIMO for mitigating a path loss of radio waves in an ultra-high frequency band and increasing a propagation distance of radio waves, support for various numerologies (multiple subcarrier spacing operation, and the like) for efficient use of ultra-high frequency resources and dynamic operation for slot formats, initial access technology for supporting multi-beam transmission and broadband, a definition and operation of a band-width part (BWP), a new channel coding method such as low density parity check (LDPC) code for large capacity data transmission and polar code for high reliable transmission of control information, L2 pre-processing, and network slicing that provides a dedicated network specialized for specific services.

Currently, discussions are ongoing to improve initial 5G mobile communication technology and enhance a performance thereof in consideration of services that 5G mobile communication technology was intended to support, and physical layer standardization for technologies such as vehicle-to-everything (V2X) for helping driving determination of an autonomous vehicle and increasing user convenience based on a location and status information of the vehicle transmitted by the vehicle, new radio unlicensed (NR-U) for the purpose of a system operation that meets various regulatory requirements in unlicensed bands, NR UE power saving, a non-terrestrial network (NTN), which is direct UE-satellite communication for securing coverage in areas where communication with a terrestrial network is impossible, and positioning is in progress.

Further, standardization in the field of air interface architecture/protocol for technologies such as industrial Internet of things (IIoT) for supporting new services through linkage and convergence with other industries, integrated access and backhaul (IAB) that provides nodes for expanding network service areas by integrating wireless backhaul links and access links, mobility enhancement including conditional handover and dual active protocol stack (DAPS) handover, and 2-step RACH for NR that simplifies a random access procedure is also in progress, and standardization in the field of system architecture/service for 5G baseline architecture (e.g., service based architecture, service based interface) for applying network functions virtualization (NFV) and software-defined networking (SDN) technologies, mobile edge computing (MEC) that receives services based on a location of a UE, and the like is also in progress. When such a 5G mobile communication system is commercialized, connected devices in an explosive increase trend will be connected to communication networks; thus, it is expected that function and performance enhancement of a 5G mobile communication system and integrated operation of connected devices will be required. To this end, new research on extended reality (XR) for efficiently supporting augmented reality (AR), virtual reality (VR), mixed reality (MR), and the like, 5G performance improvement and complexity reduction using artificial intelligence (AI) and machine learning (ML), AI service support, metaverse service support, and drone communication will be conducted.

Further, the development of such a 5G mobile communication system will be the basis for the development of full duplex technology for improving frequency efficiency and system network of 6G mobile communication technology, satellite, AI-based communication technology that utilizes artificial intelligence (AI) from a design stage and that realizes system optimization by internalizing end-to-end AI support functions, and next generation distributed computing technology that realizes complex services beyond the limits of UE computing capabilities by utilizing ultra-high-performance communication and computing resources as well as a new waveform for ensuring coverage in a terahertz band of 6G mobile communication technology, full dimensional MIMO (FD-MIMO), multi-antenna transmission technologies such as an array antenna and large scale antenna, metamaterial-based lenses and antennas for improving coverage of terahertz band signals, high-dimensional spatial multiplexing technology using orbital angular momentum (OAM), and reconfigurable intelligent surface (RIS) technology.

DISCLOSURE OF INVENTION

Technical Problem

Methods for transmitting data of a user terminal in a roaming situation in a wireless communication system may exist in various forms. In this case, in the case of transmitting non-Internet protocol (non-IP) address data of a user terminal in a roaming situation, information on a data transmission method of the terminal may be changed at an actual data transmission timepoint compared to an initial registration timepoint. In this way, in the case that the data transmission method is changed, data transmission of the terminal may not be possible.

Therefore, the disclosure provides a method and device for efficient transmission of non-IP data transmitted by a terminal in a roaming situation in a wireless communication system.

The disclosure provides a method and device capable of transmitting non-IP data, even if a data transmission method of a terminal is changed at an actual data transmission timepoint compared to a registration timepoint in a wireless communication system.

The disclosure further provides a home-routed data transmission method for data transmitted by a terminal in a roaming situation in a wireless communication system.

Solution to Problem

According to an embodiment of the disclosure, a method for unified data management (UDM) of a wireless communication system to control transmission of non-Internet protocol (non-IP) address data of a roaming terminal may include receiving, from an access and mobility management function (AMF) device that has registered the roaming terminal in a visited public land mobile network (VPLMN), a subscriber information request message of the roaming terminal; providing, to the AMF, subscriber information of the terminal; receiving, from a network exposure function (NEF), a non-IP data delivery (NIDD) authorization request message including configuration information indicating whether NIDD of the roaming terminal passes through the NEF; and updating terminal subscriber information of the roaming terminal based on the received NIDD authorization request message, wherein the terminal subscriber information may include session management subscription data and session management function (SMF) selection subscription data. According to another embodiment of the disclosure, a unified data management (UDM) device for controlling transmission of non-IP data of a roaming terminal in a wireless communication system may include a network interface configured to communicate with other network functional devices; a memory configured to store terminal information; and at least one processor, wherein the at least one processor may be configured to receive a subscriber information request message of the roaming terminal from an access and mobility management function (AMF) device that has registered the roaming terminal in a visited public land mobile network (VPLMN), to provide subscriber information of the terminal to the AMF, to receive a non-IP data delivery (NIDD) authorization request message including configuration information indicating whether NIDD of the roaming terminal passes through the NEF from a network exposure function (NEF), and to update terminal subscriber information of the roaming terminal based on the received NIDD authorization request message, wherein the terminal subscriber information may include session management subscription data and session management function (SMF) selection subscription data.

Advantageous Effects of Invention

According to the disclosure, when a terminal transmits non-Internet protocol (non-IP) address data through a home-routed path in a roaming situation, session creation failure due to mismatch of terminal subscription information can be solved.

MODE FOR THE INVENTION

Hereinafter, embodiments of the disclosure will be described in detail with reference to the accompanying drawings. Further, in describing the disclosure, in the case that it is determined that a detailed description of a related well-known function or constitution may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification. Hereinafter, a base station is a subject performing resource allocation of a terminal, and may be at least one of an eNode B, a node B, a base station (BS), a next generation radio access network (NG RAN), a radio access unit, a base station controller, or a node on a network. The terminal may include an IoT equipment, a user equipment (UE), a NextGeneration UE (NG UE), a mobile station (MS), a mobile terminal (MT), a cellular phone, a smart phone, a computer, or a multimedia system capable of performing a communication function. Further, embodiments of the disclosure will be described below using the 5G system as an example, but embodiments of the disclosure may also be applied to other communication systems with similar technical background. Further, the embodiments of the disclosure may be applied to other communication systems through some modifications without significantly departing from the scope of the disclosure by the determination of a person with skilled technical knowledge.

As the wireless communication system evolves from a 4G system to a 5G system, a NextGen Core (NG Core), which is a new core network, is defined. The new core network virtualizes all existing network entities (NE) to constitute a network function (NF). Further, the new core network may separate a mobility management entity (MME) function into mobility management (MM) and session management (SM) and manage UE mobility based on the usage type of the UE.

Further, the 5G wireless communication system should support various UEs. For example, the 5G wireless communication system may support various UEs such as an enhanced mobile broadband (eMBB) UE, ultra reliable low latency communications (URLLC) UE, and cellular Internet of things (CIoT) UE. The CIoT UE may send and receive packets without an Internet protocol (IP) address to and from an application function/server (AF/AS) for data communication.

In order for the CIoT UE to send and receive non-IP packets (data) to and from the server, it is necessary to configure a path for transmitting and receiving data between a core network and a service server. To this end, a configuration procedure of a configuration for non-IP data delivery (NIDD) between the core network and the service server may be performed.

Figure 1:
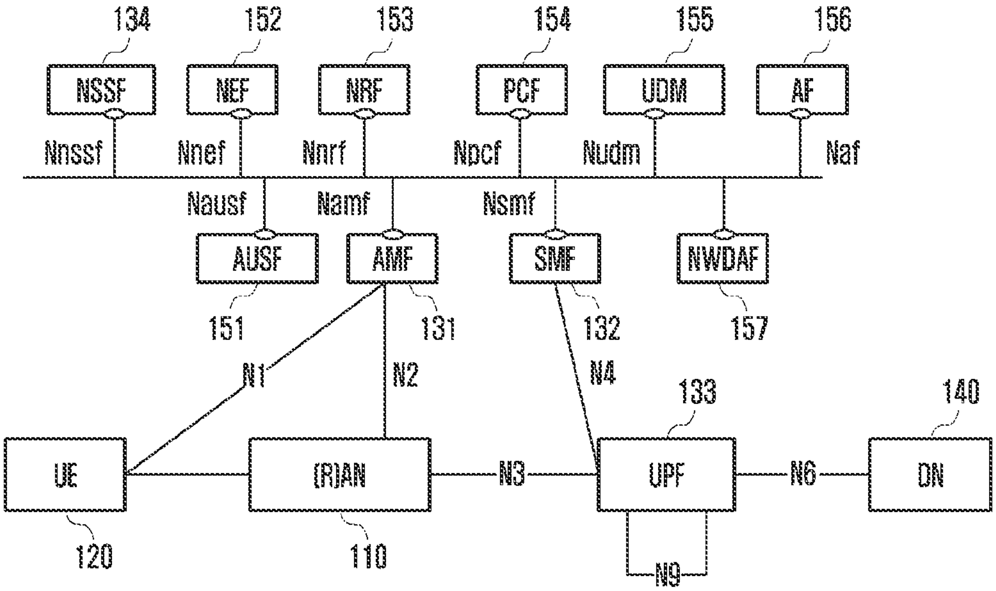
FIG. 1 is a diagram illustrating a structure for connection between a 5G core network and a UE according to an embodiment of the disclosure.

FIG. 1 is a diagram illustrating a structure for connection between a 5G core network and a UE according to an embodiment of the disclosure.

Before reference to FIG. 1, NFs will be described a little more. As previously described, in the 5G core network, all network entities are virtualized to constitute each NF. These NFs may be actually driven on a server. For example, one NF may be driven on one server or different NFs may be driven on one server. As another example, two or more NFs performing the same function may be driven on one server. Further, each NF may be implemented into one instance, as needed. However, because each NF may be implemented on a server, it may be understood that the each NF includes a physical device. Therefore, in the following description, it may be understood that one specific NF includes components of a device.

With reference to FIG. 1, an operation of each NF constituting a 5G core network (5GC) and the connection relationship of each NF with the UE will be described.

According to an embodiment of the disclosure, the 5GC may include NFs illustrated in FIG. 1. The 5GC is not limited to the example of FIG. 1, and may include more or fewer NFs than the NFs illustrated in FIG. 1.

FIG. 1 illustrates a radio access node (RAN) 110 and a user equipment (UE) 120 as some of nodes using a wireless channel in the 5G communication system. Although FIG. 1 illustrates only one RAN 110 and one UE 120, other base stations identical or similar to the RAN 110 may be further included. Further, although FIG. 1 illustrates only one UE 120, it is obvious to those skilled in the art that a plurality of UEs may be actually included in one base station.

The RAN 110 is a network infrastructure that provides wireless access to the UE 120. The RAN 110 has coverage defined as a predetermined geographic area based on a distance that may transmit a signal (not illustrated in FIG. 1). In addition to the base station, the RAN 110 may be referred to as an 'access point (AP)', 'eNodeB (eNB)', '5th generation node (5G node)', 'wireless point', a 'transmission/reception point (TRP)' or other types of names described above. Further, the RAN may include one central unit (CU) and a plurality of remote units (RU) that actually transmit wireless signals.

The UE 120 is a device used by a user and communicates with the RAN 110 through a wireless channel. Further, in some cases, the UE 120 may be operated without user involvement. For example, the UE 120 is a device that performs machine type communication (MTC) and may not be carried by the user. The UE 120 illustrated in FIG. 1 may include at least one user portable device and/or include at least one MTC. In particular, the UE 120 may be a CIoT UE capable of providing services according to the disclosure. Further, the UE 120 of FIG. 1 may be referred to as a 'terminal', a 'mobile station', a 'subscriber station', a 'remote terminal', a 'wireless terminal', 'user device', or other terms with equivalent technical meaning.

Hereinafter, each NF of 5GC will be described. NFs described below may be implemented into a single device, as described above or may be implemented into an instance running on a single device and/or software. Therefore, hereinafter, it is obvious to those skilled in the art that even if the term "device" is not specifically given to each NF, each NF may be understood in the form of a device.

According to an embodiment of the disclosure, an access and mobility management function (AMF) 131 may be a network function that manages the mobility of the UE 120.

According to an embodiment of the disclosure, a session management function (SMF) 132 may be a network function that manages packet data network (PDN) connection provided to the UE 120. The PDN connection between the UE 120 and the SMF 132 may be referred to as a protocol data unit (PDU) session.

According to an embodiment of the disclosure, a policy control function (PCF) 154 may be a network function that applies a mobile communication service provider's service policy, charging policy, and policy for PDU session to the UE 120.

According to an embodiment of the disclosure, unified data management (UDM) 155 may be a network function that stores information on the subscriber and/or the UE 120. According to an embodiment of the disclosure, a network exposure function (NEF) 152 may be a function that provides information on the UE 120 to a server outside the 5G network. Further, by providing information required for the service provided in the server in a unified data repository (UDR) (not illustrated in FIG. 1) by associating with the server of the 5G network, the NEF 152 may provide a function of storing the information in the UDR. Further, the NEF 152 may access to information managing the UE 120, and transmit subscription to a mobility management event of the corresponding UE, subscription to a session management event of the corresponding UE, request for session-related information, configuration for billing information for the corresponding UE, request for a PDU session policy change for the corresponding UE, and small data for the corresponding UE.

According to an embodiment of the disclosure, a user plane function (UPF) 133 may be a function that serves as a gateway for transmitting user data (PDU) received from the UE 120 or for transmitting to the UE 120 to a data network (DN) 140.

According to an embodiment of the disclosure, a network repository function (NRF) 153 may store a state of the NF and perform processing in the case that other NFs receive a request for discovering an accessible NF.

According to an embodiment of the disclosure, an authentication server function (AUSF) 151 may authenticate the UE 120 in a 3GPP access network and a non-3GPP access network.

According to an embodiment of the disclosure, a network slice selection function (NSSF) 134 may perform a function of selecting a network slice instance provided to the UE 120.

According to an embodiment of the disclosure, the data network (DN) 140 may be a data network through which the UE 120 transmits and receives data in order to use a network operator's service or a 3rd party service.

According to an embodiment of the disclosure, a network data analytics function (NWDAF) 157 may collect and analyze data from several NFs and provide analyzed information or predicted results to other NFs.

An application function (AF) 156 may be a server that provides services to the user and/or the UE 120 in association with the mobile communication network.

In FIG. 1, each interface is illustrated together. For example, a service-based interface exhibited by the NSSF 134 is Nnssf, a service-based interface exhibited by the NEF 152 is Nnef, a service-based interface exhibited by the AMF 131 is Namf, and a service-based interface exhibited by the SMF 132 is Nsmf. In addition, Nnrf, Npcf, Nudm, Naf, and the like may be understood in the same form.

Further, FIG. 1 illustrates reference points. For example, a reference point between the UE 120 and the AMF 131 is N1, a reference point between the (R)AN 110 and the AMF 131 is N2, a reference point between the (R)AN and the UPF 133 is N3, a reference point between the SMF 132 and the UPF 133 is N4, a reference point between two different UPFs is N9, and a reference point between the UPF and the DN 140 is N6. These reference points N1, N2, N3, N4, N6, and N9 may become data transmission paths between the corresponding NFs and/or between the UE and the NF.

Figure 2:
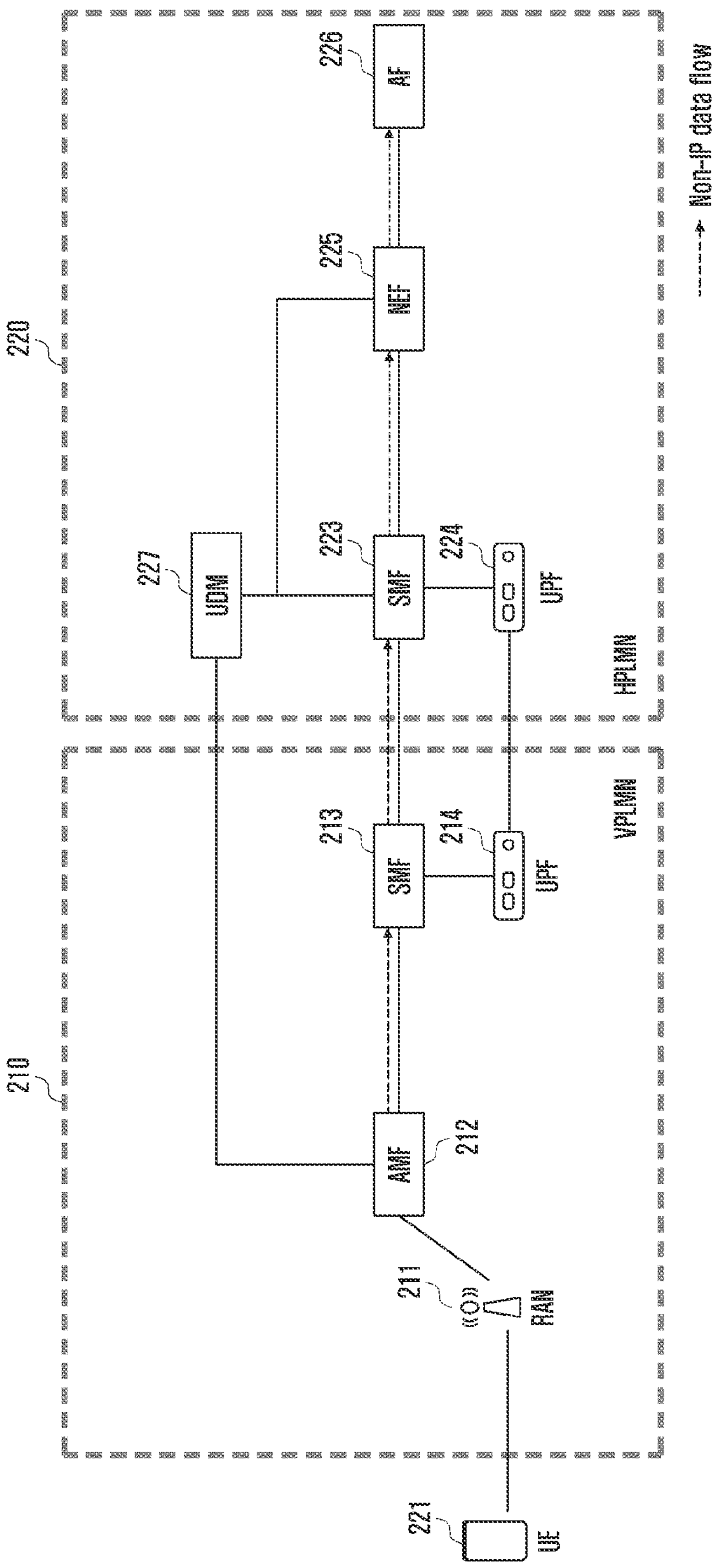
FIG. 2 is a diagram illustrating a home-routed NIDD data transmission path when a CIoT UE is in a roaming situation according to an embodiment of the disclosure.

FIG. 2 is a diagram illustrating a home-routed NIDD data transmission path when a CIoT UE is in a roaming service state according to an embodiment of the disclosure. With reference to FIG. 2, a visited public land mobile network (VPLMN) 210 and a home public land mobile network (HPLMN) 220 are illustrated together to provide a roaming service. It is noted that the VPLMN 210 and the HPLMN 220 may each include the components of FIG. 1 described above and that FIG. 2 illustrates only NFs for describing NIDD data transmission according to the disclosure. Further, in the disclosure, a CIoT UE 221 may receive a roaming service and be in a state registered in the VPLMN 210. Further, with regard to reference numerals, even if the NF is the same as the NF illustrated in FIG. 1, it is divided into the VPLMN and the HPLN; thus, reference numerals different from those in FIG. 1 will be used. Accordingly, the CIoT UE 221 also uses a different reference numeral from that in FIG. 1.

Further, in the following description, each NF of the VPLMN 210 may be identified by adding "V-" to identify the NF of the VPLMN 210. Further, each NF of the HPLMN 220 may be identified by adding "H-" to identify the NF of the HPLMN 220. However, even if it is marked to be not identified, as described above, the reference numeral may be used for identifying which PLMN the NF is included in.

The CIoT UE 221 may register in an AMF 212 through a RAN 211 within the VPLMN 210. Thereafter, the CIoT UE 221 may transmit non-IP data to a control plane or a user plane. Such a transmission method may be optional according to examples described below. In the case that it is determined to transmit non-IP data transmitted by the CIoT UE 221 to the control plane, in order to transmit the non-IP data to the control plane, the V-AMF 212 may create a PDU session over the control plane for non-IP. In the following description, non-IP data and non-IP packets may be understood to have the same meaning. Further, unless otherwise specified, data and packets transmitted and/or received by the CIoT UE 221 may mean non-IP data and non-IP packets. In the case that the CIoT UE 221 transmits data to the control plane, an N3 data transmission path between the RAN 211 and an UPF 214 is not used.

Non-IP data transmitted by the CIoT UE 221 is transmitted to an external AF 226 via the AMF 212 and an SMF 213 of the VPLMN 210. In this case, because non-IP data transmitted by the CIoT UE 221 is transmitted in a home-routed method, the non-IP data may pass through an NEF 225 (the case that non-IP data is transmitted to the control plane) of the HPLMN 220 or an UPF 224 (the case that non-IP data is transmitted to the user plane) of the HPLMN 220.

The determination on whether to transmit the non-IP data transmitted by the CIoT UE 221 through the NEF 225 of the HPLMN 220 or through the UPF 224 of the HPLMN 220 may be made according to UE subscriber information, for example, session management subscription data in which an H-SMF 223 receives from UDM 227. When the NEF identity for NIDD field among UE subscriber information received from the UDM 227 includes NEF ID information, the non-IP data may be transmitted to the AF 226 via the NEF corresponding to the NEF ID. FIG. 2 illustrates the case of including the NEF 225 with the NEF ID. Therefore, non-IP data may be provided from the AMF 212 of the VPLMN 210 to the SMF 223 of the HPLMN 220 through the SMF 213. Further, as described above, the SMF 223 of the HPLMN 220 may select the NEF 225 based on UE subscriber information (e.g., session management subscription data) received from the UDM 227 and transmit non-IP data to the selected NEF 225. Therefore, the NEF 225 of the HPLMN 220 may provide the received non-IP data to the corresponding AF 226.

When the NEF identity for NIDD field among UE subscriber information (e.g., session management subscription data) received by the H-SMF 223 from the UDM 227 does not include NEF ID information, the H-SMF 223 may transmit non-IP data to the AF 226 via the UPF 224. It is noted that FIG. 2 does not illustrate the data flow (arrow) in which the H-SMF 223 transmits non-IP data to the AF 226 via the UPF 224.

As described above, in the case that non-IP data transmitted by the CIoT UE 221 is transmitted through the control plane, the non-IP data passes through the AMF 212 and the SMF 213 of the VPLMN 210, and is transmitted to the AF 226 via the SMF 223 and the NEF 225 of the HPLMN 220. In this case, because non-IP data is transmitted to the AF via the NEF 225, the AMF 212 of the VPLMN 210 may provide information indicating to not select the V-UPF 214 to the V-SMF 213. Information indicating to not select the V-UPF 214 provided to the V-SMF 213 by the V-AMF 212 may be referred to the invoke NEF indication field of SMF selection subscription data received by the CIoT UE 221 from the UDM 227 of the HPLMN 220 when the CIoT UE 221 registers in the VPLMN 210. Therefore, in the case that the V-AMF 212 should configure a path for non-IP data transmission to the control plane with reference to the invoke NEF indication, the V-AMF 212 may provide separate indication information indicating to provide the invoke NEF indication field as it is to the V-SMF 213 or to not select the UPF to the V-SMF 213. When separate indication information indicating to provide an invoke NEF indication field or to not select the UPF exists in PDU session configuration request information provided from the V-AMF 212, the V-SMF 213 may recognize that a PDU session for transmitting non-IP data transmitted by the CIoT UE 221 should transmit data through the corresponding NEF 225 via the V-SMF 213 and the H-SMF 223. Therefore, the V-SMF 213 does not need to select the V-UPF 214.

However, in the case that the invoke NEF indication field or corresponding information does not exist in the PDU session configuration request information received from the V-AMF 212, non-IP data transmitted by the CIoT UE 221 should be transmitted to the AF 226 via the V-UPF 214 and the H-UPF 224. Therefore, in the case that the invoke NEF indication field or corresponding information does not exist in the PDU session configuration request information, the V-SMF 213 should select the V-UPF 214 and transmit information thereof to the H-SMF 223 to configure a data path between the V-UPF 214 and the H-UPF 224.

However, when the NEF identity for NIDD field of UE subscriber information (e.g., session management subscription data) received by the H-SMF 223 from the UDM 227 and the invoke NEF indication field of SMF selection subscription data in which the V-AMF 212 is received from the UDM 227 at a registration time point of the CIoT UE 221 are inconsistent with each other, a path configuration of the PDU session between the VPLMN 210 and the HPLMN 220 will fail.

The case that a path configuration of the PDU session between the VPLMN 210 and the HPLMN 220 fails may be due to the time difference as follows. First, when the CIoT UE 221 registers in the VPLMN 210, the V-AMF 212 receives UE information from the UDM 227. Further, the H-SMF 223 receives UE information from the UDM 227 when the CIoT UE 221 creates a PDU session, that is, a timepoint at which data to be transmitted from the CIoT UE 221 is generated. Therefore, there may be a significant time difference between a timepoint at which the CIoT UE 221 registers in the VPLMN 210 and a timepoint at which data to be transmitted by the CIoT UE 221 is generated. In the case that a data transmission method of the corresponding CIoT UE 221 is changed due to such the difference in timepoint, mismatch may occur in UE information between the V-AMF 212 and the H-SMF 223.

When mismatch occurs in UE information between the V-AMF 212 and the H-SMF 223, the path configuration of the PDU session between the VPLMN 210 and the HPLMN 220 fails, as described above.

In the embodiment of the disclosure described below, methods for solving the problem caused by the mismatch in UE information between the V-AMF 212 and the H-SMF 223, as described above will be described.

Figure 3:
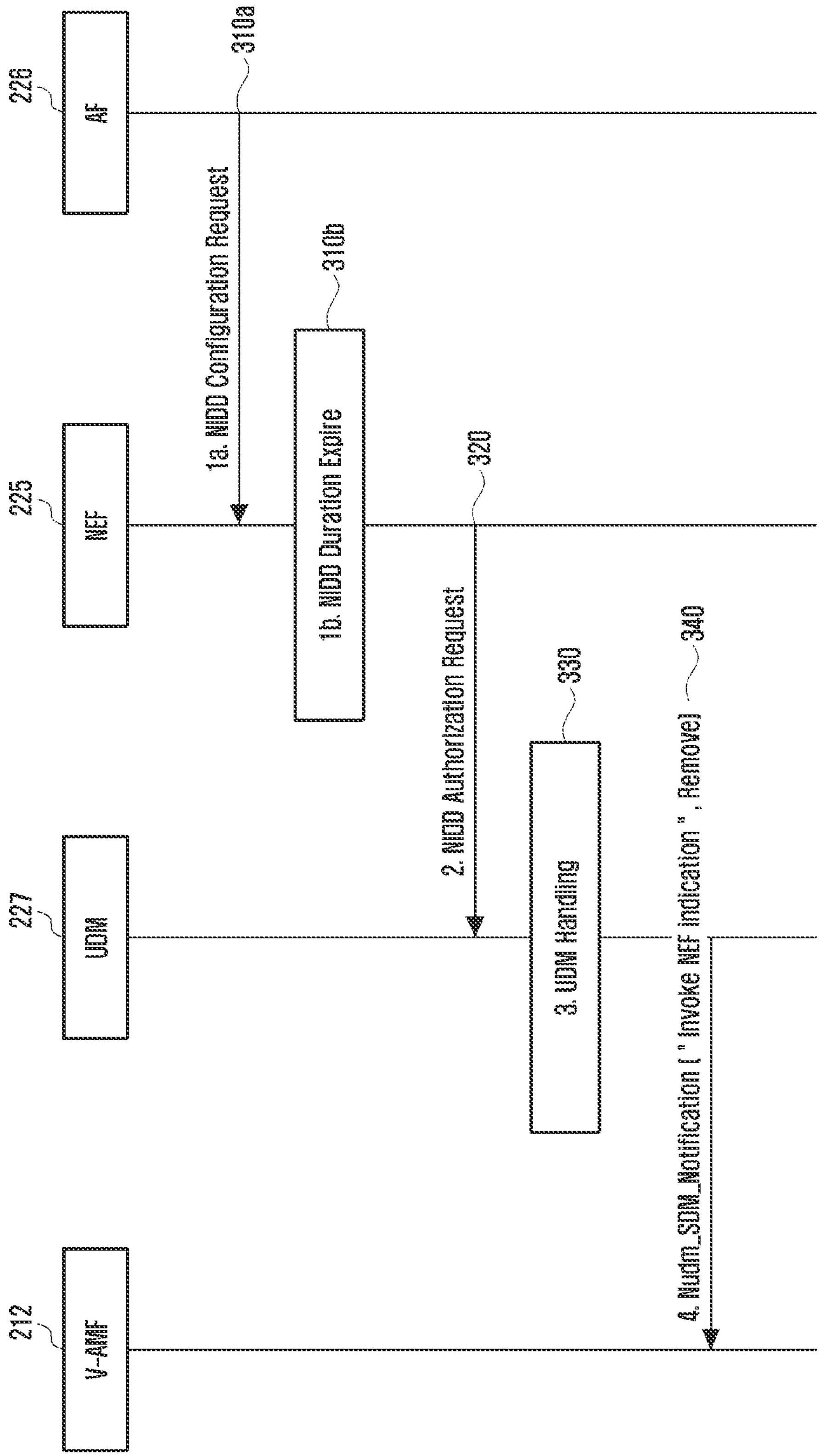
FIG. 3 is a signal flow diagram for resolving mismatch when updating SMF selection subscription data according to an embodiment of the disclosure.

FIG. 3 is a signal flow diagram for resolving mismatch when updating SMF selection subscription data according to an embodiment of the disclosure.

Before reference to FIG. 3, each NF described in the disclosure will be described using the NFs in FIG. 2 described above. Therefore, the reference numerals of the NFs described with reference to FIG. 2 are used as they are.

Further, the situation before the flow of FIG. 3 starts will be briefly described with reference to FIG. 2. The CIoT UE 221 may be located in the VHPLMN 210.

Therefore, the CIoT UE 221 may be in a state of performing a registration procedure in the V-AMF 212. The V-AMF 212 may receive subscriber information on the CIoT UE 221 from the UMD 227 of the HPLMN 220 when the registration process of the CIoT UE 221 proceeds. In this case, the subscriber information may include SMF selection subscription data including the invoke NEF indication field, as described above. The V-AMF 212 may identify whether a data path of the CIoT UE 221 should pass through the NEF (non-IP data is transmitted through the control plane) based on the received invoke NEF indication field.

The flowchart of FIG. 3 described below will first be described assuming the case of determining that an NIDD path of the CIoT UE 221 should pass through the NEF 225 based on the invoke NEF indication field.

With reference to FIG. 3, steps 310*a* and 310*b* may be performed selectively or sequentially (or simultaneously). When describing the case that steps 310*a* and 310*b* are performed sequentially, step 310*a* may be updated so that a specific CIoT UE 221 no longer transmits non-IP data configured to single network slice selection assistance information/data network name (S-NSSAI/DNN) to the AF 226 via the NEF 225. In the case that the specific CIoT UE 221 is updated to no longer transmit non-IP data to the AF 226 via the NEF 225, the AF 226 may transmit an NIDD configuration request message to the NEF 225 in step 310*a*. Therefore, the NEF 225 may perform step 310*b*. As another example, there may be the case that the NEF 225 is directly updated so that the specific CIoT UE 221 no longer transmits non-IP data configured to the S-NSSAI/DNN to the AF 226 via the NEF 225 without performing step 310*a* (or simultaneously with step 310*a*). Such update may be configured by an operator of the PLMN and be usually performed pursuant to a contract with an AF operator. Therefore, a message of step 310*a* does not actually exist, but a manager of the NEF 225 and a manager of the AF 226 may change it based on the contract between operators. In this way, in the case that the specific CIoT UE 221 is updated to no longer transmit non-IP data configured to the S-NSSAI/DNN to the AF 226 via the NEF 225 without performing step 310*a*, the NEF 225 may perform a procedure according to NIDD duration expire for the corresponding CIoT UE in step 310*b*. Here, the CIoT UE may be one UE or a group of a plurality of UEs. Hereinafter, for convenience of description, operations performed for one UE will be described.

After steps 310*a* and 310*b* or only step 310*b* is performed, the NEF 225 may transmit an NIDD authorization request message to the UDM 227 in step 320. In this case, the NIDD authorization request message may include configuration information that enables the corresponding CIoT UE no longer transmits non-IP data to the AF 226 through the NEF 225.

When the UDM 227 receives the NIDD authorization request message in step 320, the UDM 227 may update UE subscriber information for the corresponding CIoT UE in step 330. In this case, as described above, the UE subscriber information may include an operation of configuring information on not transmitting through the NEF 225 or update of data therefor in SMF selection subscription data transmitted to the V-AMF 212 and session management subscription data transmitted to the H-SMF. According to an embodiment of such an update operation, the UDM 227 may perform an operation of deleting an invoke NEF indication value of SMF selection subscription data of the S-NSSAI/DNN value and deleting the NEF identity for NIDD field of session management subscription data for the corresponding CIoT UE.

Thereafter, in step 340, in order to update the SMF selection subscription data of the V-AMF 212 in which the corresponding CIoT UE is registered, the UDM 227 may transmit a command instructing to delete (or remove) the invoke NEF indication through an update indication message, for example, an Nudm_SDM_Notification message. In this case, the UDM 227 may store information on the V-AMF 212 in which the CIoT UE is registered and information on the V-AMF 212 that has performed a registration procedure of the CIoT UE. Therefore, the UDM 227 may transmit a command instructing to delete the invoke NEF indication to the V-AMF 212 so that the CIoT UE transmitting non-IP data does not pass through the NEF based on the information stored in the UDM 227.

FIG. 3 described above illustrates the case that a specific CIoT UE is registered in the VPLMN in a state that the specific CIoT UE is configured to transmit non-IP data to the AF through the NEF. Further, in this case, the case that the CIoT UE is changed to not transmit non-IP data to the AF through the NEF was described.

The above-described procedure may change a configuration in the same manner even to the case that the CIoT UE is modified to transmit non-IP data to the AF through the NEF after the CIoT UE is registered in the VPLMN in a state that the CIoT UE is configured to transmit non-IP data to the AF without through the NEF. That is, when non-IP data of the CIoT UE advancing toward a specific S-NSSAI/DNN is updated to be transmitted to the AF 226 via the specific NEF 225 as a result of step 310*a*, UE subscriber information of the V-AMF 212 and the UDM 227 may be updated through the above procedure. In this case, a value configured in the message of step 340 may be to perform an "add" command rather than a "remove" command.

Figure 4:
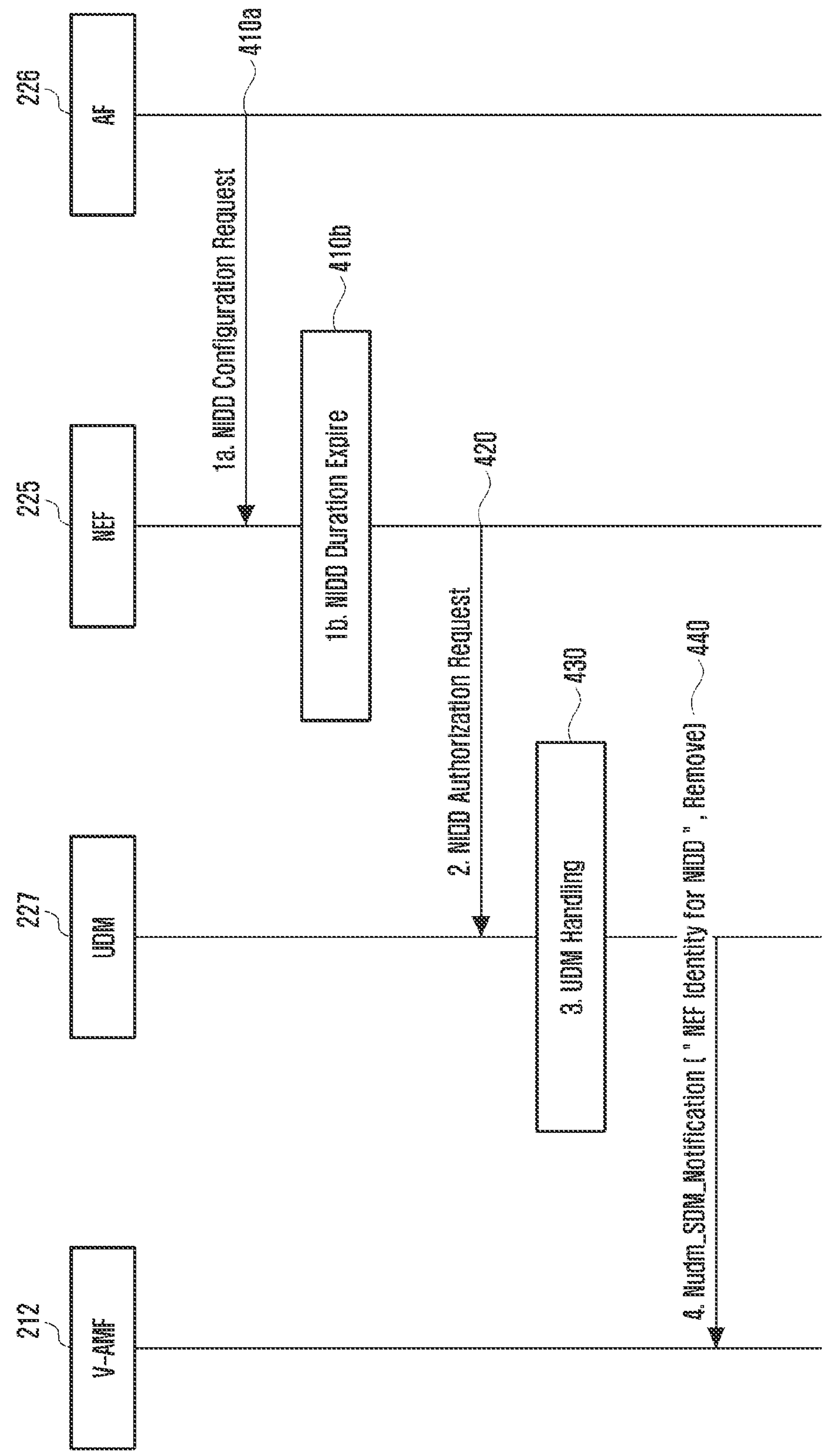
FIG. 4 is a signal flow diagram of each NF when updating session management subscription data information according to an embodiment of the disclosure.

FIG. 4 is a signal flow diagram of each NF when updating session management subscription data information according to an embodiment of the disclosure.

In FIG. 4, similarly to the previous description of FIG. 3, each NF illustrated in FIG. 4 will be described using the NFs described with reference to FIG. 2. Therefore, the reference numerals of the NFs described with reference to FIG. 2 are used as they are. Further, the situation before the flow of FIG. 4 starts will be briefly described with reference to FIG. 2. The CIoT UE 221 may be located in the VHPLMN 210. Therefore, the CIoT UE 221 may be in a state of performing a registration procedure in the V-AMF 212. The V-AMF 212 may receive subscriber information on the CIoT UE 221 from the UMD 227 of the HPLMN 220 when the registration process of the CIoT UE 221 proceeds. In this case, the subscriber information may include SMF selection subscription data including an invoke NEF indication field, as described above. The V-AMF 212 may identify whether a data path of the CIoT UE 221 should pass through the NEF (non-IP data is transmitted through the control plane) based on the received invoke NEF indication field.

The flowchart of FIG. 3 described below will first be described assuming the case of determining that the data path of the CIoT UE 221 should pass through the NEF based on the invoke NEF indication field.

With reference to FIG. 4, steps 410*a* and 410*b* may be performed selectively or sequentially. For example, step 410*a* may be updated so that a specific CIoT UE 221 no longer transmits non-IP data configured to S-NSSAI/DNN to the AF 226 via the NEF 225. In the case that the specific CIoT UE 221 is updated to no longer transmit non-IP data to the AF 226 via the NEF 225, the AF 226 may transmit a NIDD configuration request message without an IP address to the NEF 225 in step 410*a*. Therefore, the NEF 225 may perform step 410*b*.

As another example, there may be the case that the NEF 225 is updated directly so that the specific CIoT UE 221 no longer transmits non-IP data configured to S-NSSAI/DNN to the AF 226 via the NEF 225 without performing step 410*a*. Such update may be configured by an operator of the PLMN. In this way, in the case that the specific CIoT UE 221 is updated to no longer transmit non-IP data configured to S-NSSAI/DNN to the AF 226 via the NEF 225 without performing step 410*a*, the NEF 225 may perform a procedure according to NIDD duration expire for the corresponding CIoT UE in step 310*b*. Here, the CIoT UE may be one UE or a group of a plurality of UEs. Hereinafter, for convenience of description, operations performed for one UE will be described.

After steps 410*a* and 410*b* or only step 410*b* is performed, the NEF 225 may transmit an NIDD authorization request message to the UDM 227 in step 420. In this case, the NIDD authorization request message may include configuration information that enables the corresponding CIoT UE to no longer transmit non-IP data to the AF 226 through the NEF 225.

When the UDM 227 receives the NIDD authorization request message in step 420, the UDM 227 may update UE subscriber information on the corresponding CIoT UE in step 430. In this case, as described above, the UE subscriber information may include an operation of configuring information on not transmitting through the NEF 225 or update of data therefor in SMF selection subscription data transmitted to the V-AMF 212 and session management subscription data transmitted to the H-SMF. According to an embodiment of such an update operation, the UDM 227 may perform an operation of deleting a value of the invoke NEF indication field of SMF selection subscription data of the S-NSSAI/DNN value and deleting NEF identity for NIDD information of session management subscription data for the corresponding CIoT UE.

Thereafter, in step 440, in order to update session management subscription data of the H-SMF 223, the UDM 227 may transmit a command instructing to delete (or remove) the NEF identity for NIDD through an update indication message, for example, the Nudm_SDM_Notification message. Step 440 may be performed in the case that step 430 is performed after a request for information on the corresponding CIoT UE exists from the H-SMF 223. Step 440 may be provided in the case that there is a request for UE subscriber information from the H-SMF 223. As another example, step 440 may be performed immediately in the case that there is a request for UE subscriber information from the H-SMF 223 and that steps 420 and 430 are performed within a preconfigured time. As another example, step 440 may be performed immediately under specific conditions (based on a time point at which the roaming UE registers in the VPLMN and the frequency of data transmission, and the like).

FIG. 4 described above illustrates the case that a specific CIoT UE is changed to not again transmit non-IP data to the AF through the NEF in a state that the specific CIoT UE is configured to transmit non-IP data to the AF through the NEF.

The method described with reference to FIG. 4 may be equally applied to the opposite case of the above assumption. That is, even in the case that the configuration is changed to transmit again non-IP data to the AF through the NEF in a state that a specific CIoT UE is configured not to transmit non-IP data to the AF through the NEF, the flowchart of FIG. 4 may be equally applied.

When describing the opposite case of the above case, when non-IP data advancing toward specific S-NSSAI/DNN has been updated to be transmitted to the AF 226 via a specific NEF 225 as a result of step 410*a*, the UE subscriber information of the H-SMF 223 and the UDM 227 may be updated through the above procedure. That is, a message of step 440 may be to perform an "add" command rather than a "remove" command.

Figure 5:
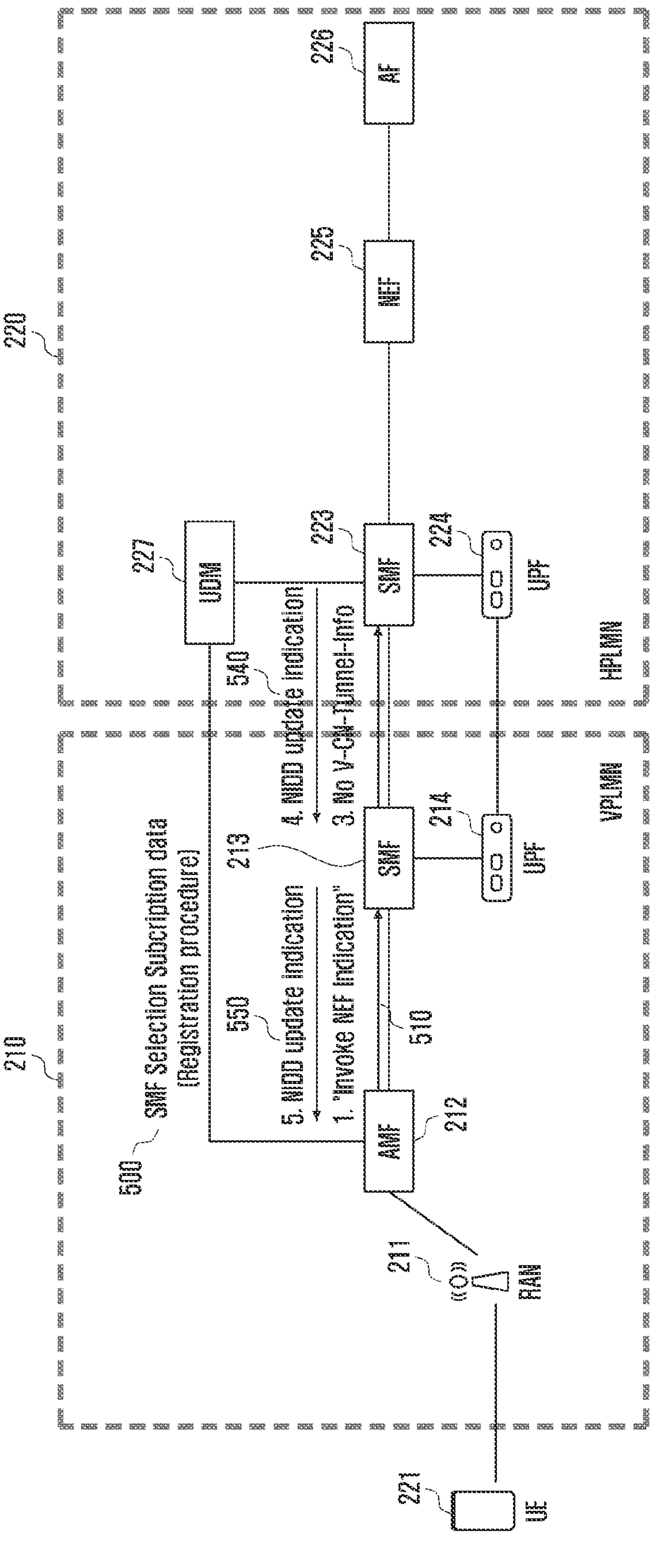
FIG. 5 is a signal flow diagram of the case of updating UE subscriber information through direct communication between an H-SMF and a V-SMF according to an embodiment of the disclosure.

FIG. 5 is a signal flow diagram of the case of updating UE subscriber information through direct communication between an H-SMF and a V-SMF according to an embodiment of the disclosure.

In FIG. 5, the reference numerals of the NFs described with reference to FIG. 2 will be used as they are, and the signal transmitted from each NF will be described with each step assigned. Further, the description of FIG. 5 describes a state that the CIoT UE 221 is located in the VPLMN 210.

Therefore, the CIoT UE 221 may be in a state registered in the V-AMF 212 through the RAN 211 of the VPLMN 210. When a CIoT UE 221 belonging to another PLMN is registered, the V-AMF 212 may acquire UE subscriber information as indicated by reference numeral 500 from the UDM 227 of the HPLMN 220 of the corresponding CIoT UE 221. In this case, the UE subscriber information acquired by the V-AMF 212 may include SMF selection subscription data. As previously described, the invoke NEF indication field may be configured in SMF selection subscription data. That is, in the case that the invoke NEF indication field is configured in the SMF selection subscription data, the V-AMF 212 may transmit data transmitted from the CIoT UE 221 through the NEF and through the control plane. Therefore, when registering the CIoT UE 221, in the case that the invoke NEF indication field acquired from the UDM 227 of the HPLMN 220 is configured, the V-AMF 212 may store SMF selection subscription data in an internal memory (not illustrated in FIG. 5).

Thereafter, when data to be transmitted from the CIoT UE 221 to the AF 226 occurs at a specific time point, in step 510, the V-AMF 212 may transmit information including indication information indicating to provide the "invoke NEF indication" field stored in the memory as it is or to not select the UPF at a registration time point to the V-SMF 213.

When the V-SMF 213 receives information including indication information indicating to provide an "invoke NEF indication" field or to not select the UPF from the V-AMF 212, the V-SMF 213 may skip the V-UPF based on the received "invoke NEF indication" field in step 520 and signal the need for data transmission of the CIoT UE 221 to the H-SMF 223 without V-CN-Tunnel Info in step 530 or transmit a session configuration request message based on the need for data transmission. Here, the need for data transmission of the CIoT UE 221 without V-CN-Tunnel Info may be a message for configuring a data transmission path using the control plane.

FIG. 5 illustrates only the V-UPF 214 and the H-UPF 224. Skipping the UPF selection described above will be further described. The SMF may select a UPF appropriate for data transmission among a plurality of UPFs based on UE characteristics, service characteristics, subscriber information, and the like. When describing this based on FIG. 5, the V-SMF 213 may select one UPF appropriate for transmitting data of the CIoT UE 221 to the HPLMN 220 among a plurality of UPFs (UPFs other than the V-UPF 214 are not illustrated in FIG. 5). FIG. 5 illustrates only the V-UPF 214, which is assumed to be appropriate for transmitting data of the CIoT UE 221 to the HPLMN 220 in the VPLMN 210. This may be equally applied to the HPLMN 220. That is, the H-SMF 223 may receive data of the CIoT UE 221 from the VPLMN 210 among a plurality of UPFs (UPFs other than the H-UPF 224 are not illustrated in FIG. 5) and select one H-UPF appropriate for transmitting the data to the AF 226. FIG. 5 illustrates only the H-UPF 224, which is assumed to be appropriate for transmitting data of the CIoT UE 221 in the HPLMN 220.

In step 530, when the H-SMF 223 receives signaling or a message indicating the need for data transmission of the CIoT UE 221 without V-CN-Tunnel Info from the V-SMF 213, the H-SMF 223 may acquire subscriber information on the corresponding CIoT UE 221 from the UDM 227. In this case, the subscriber information acquired by the H-SMF 223 is session management subscription data and may include an NEF identity for NIDD field. The NEF identity for NIDD field is a field for indicating that data of the corresponding CIoT UE 221 is transmitted to the AF 226 through a specific NEF 225. Therefore, in the case that the data of the corresponding CIoT UE 221 is transmitted to the AF 226 through the specific NEF 225, the data includes the NEF identity for NIDD field. However, in the case that data of the CIoT UE 221 is changed to be not transmitted to the AF 226 through the specific NEF 225 after the corresponding CIoT UE 221 is registered in the VPLMN 210, the data does not include the NEF identity for NIDD field.

Therefore, the H-SMF 223 may identify whether the NEF identity for NIDD field is included in the session management subscription data received from the UDM 227. In the case that the NEF Identity for NIDD field is not included in the session management subscription data, in the corresponding PDU session, data should be transmitted to the AF 226 via the V-UPF 214 and the H-UPF 224. Therefore, in the case that the V-SMF 213 signals a PDU session configuration without V-CN-Tunnel Info, the H-SMF 223 may determine (or identify) that the UE subscription information stored in the V-AMF 212 needs to be updated.

In the case that the H-SMF 223 determines that the UE subscription information in the V-AMF 212 needs to be updated, in order to update the UE subscriber information stored in the V-AMF 212, the H-SMF 223 may transmit an NIDD update indication message to the V-SMF 213 in step 540. Therefore, the V-SMF 213 may transmit the received information to the V-AMF 212 in step 550. Here, the NIDD update indication message may be a message requesting deletion of the invoke NEF indication field among the UE subscriber information (SMF selection subscription data) stored in the V-AMF 212. Accordingly, when the V-AMF 212 receives the NIDD update indication message transmitted by the H-SMF 223 in order to update the UE subscriber information, the V-AMF 212 may delete the invoke NEF indication field of the SMF selection subscription data received from the UDM 227 when registering the CIoT UE 221.

When the UE subscriber information is updated in this way, the V-AMF 212 may transmit information including information indicating to select the UPF to the V-SMF 213 based on updated information because UE subscriber information of the corresponding CIoT UE 221 has been updated. Therefore, the V-SMF 213 may select again the UPF and transmit signaling or a message indicating the need for data transmission including V-CN-Tunnel Info to the H-SMF 223 based on the selected UPF. The subsequent operation may be performed according to the procedure for transmitting data of the CIoT UE 221 to the AF 226 through the UPF 224.

Figure 6:
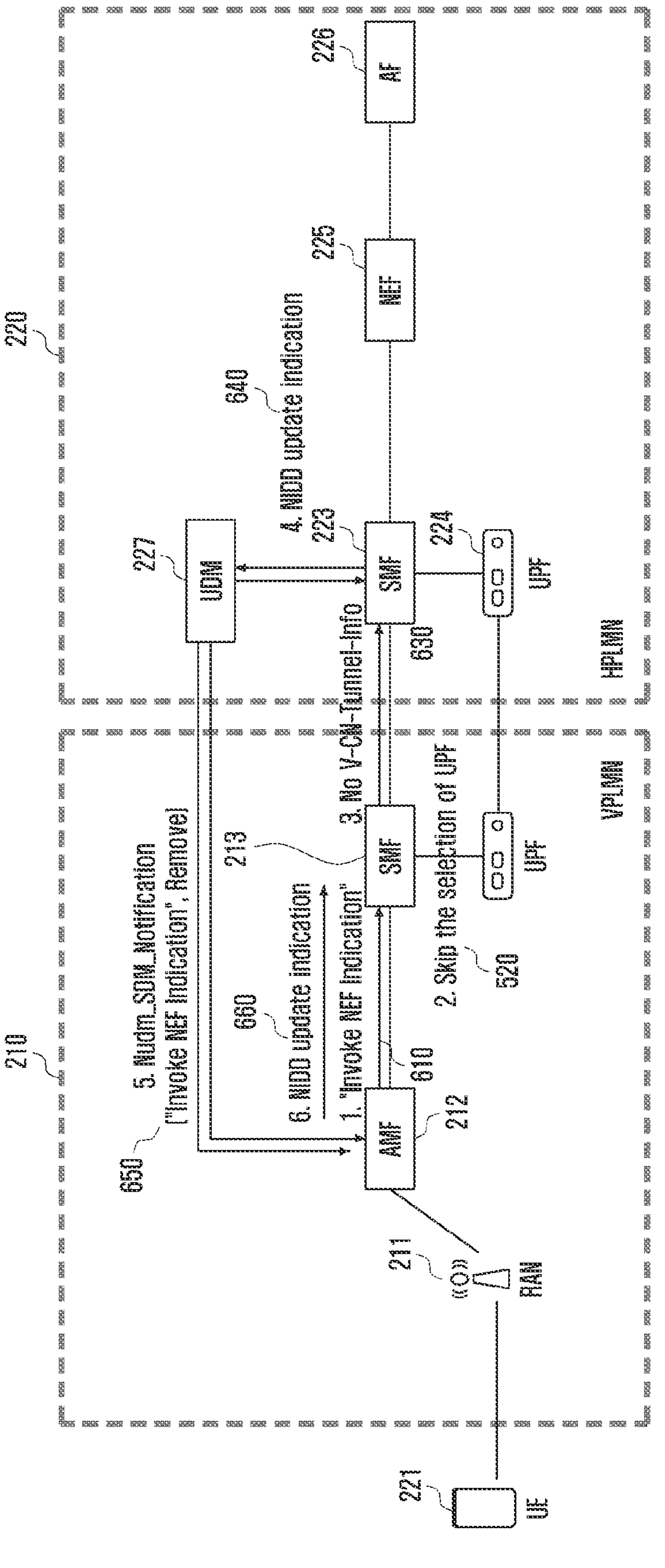
FIG. 6 is a signal flow diagram of the case that an H-SMF updates UE subscriber information of a V-AMF through UDM according to an embodiment of the disclosure.

FIG. 6 is a signal flow diagram of the case that an H-SMF updates UE subscriber information of a V-AMF through UDM according to an embodiment of the disclosure. In FIG. 6, the reference numerals of the NFs described with reference to FIG. 2 will be used as they are, and the signal transmitted from each NF will be described with each step assigned. In the description of FIG. 6, the CIoT UE 221 is located in the VPLMN 210. Therefore, the CIoT UE 221 may be in a state registered in the V-AMF 212 through the RAN 211 of the VPLMN 210. When a CIoT UE 221 belonging to another PLMN is registered, the V-AMF 212 may acquire UE subscriber information from the UDM 227 of the HPLMN 220 of the corresponding CIoT UE 221. In this case, the UE subscriber information acquired by the V-AMF 212 may include SMF selection subscription data. As previously described, SMF selection subscription data may include an invoke NEF indication field. That is, in the case that the SMF selection subscription data includes an invoke NEF indication field, the V-AMF 212 may transmit data transmitted from the CIoT UE 221 to the AF 226 via the NEF through the control plane. Therefore, when registering the CIoT UE 221, the V-AMF 212 may store SMF selection subscription data including the invoke NEF indication field acquired from the UDM 227 of the HPLMN 220 in an internal memory (not illustrated in FIG. 6).

Thereafter, when data to be transmitted from the CIoT UE 221 to the AF 226 occurs at a specific time point, in step 610, the V-AMF 212 may transmit information including information indicating to provide the "invoke NEF indication" field stored in the memory as it is or to not select the UPF at a registration time point to the V-SMF 213. When the V-SMF 213 receives information including indication information indicating to provide the "invoke NEF indication" field or to not select the UPF from the V-AMF 212, the V-SMF 213 may skip a V-UPF based on the received "invoke NEF indication" field in step 620 and signal the need for data transmission of the CIoT UE 221 without V-CN-Tunnel Info or transmit a session configuration request message based on the need for data transmission to the H-SMF 223 in step 630. Here, the need for data transmission of the CIoT UE 221 without V-CN-Tunnel Info may be a message for configuring a data transmission path using the control plane.

FIG. 6 illustrates only the V-UPF 214 and H-UPF 224, as in FIG. 5 described above. Skipping the UPF selection described above is the same as that in FIG. 5 described above. Further, FIG. 6 illustrates only the V-UPF 214 and H-UPF 224 appropriate for transmitting data of the CIoT UE 221.

In step 630, when the H-SMF 223 receives signaling or a message indicating the need for data transmission of the CIoT UE 221 without V-CN-Tunnel Info from the V-SMF 213, the H-SMF 223 may acquire subscriber information on the corresponding CIoT UE 221 from the UDM 227. In this case, the subscriber information acquired by the H-SMF 223 may be session management subscription data information. The session management subscription data information may include an NEF identity for NIDD field, as previously described. The NEF identity for NIDD field is a field for indicating that data of the corresponding CIoT UE 221 is transmitted to the AF 226 through a specific NEF 225. Therefore, in the case that data of the corresponding CIoT UE 221 is transmitted to the AF 226 through the specific NEF 225, the data includes an NEF identity for NIDD field. However, in the case that data of the CIoT UE 221 is changed to be not transmitted to the AF 226 through the specific NEF 225 after the corresponding CIoT UE 221 is registered in the VPLMN 210, the data does not include the NEF identity for NIDD field.

Therefore, the H-SMF 223 may identify whether the NEF identity for NIDD field is included in the session management subscription data received from the UDM 227. In the case that the NEF identity for NIDD field is not included in the session management subscription data, in the corresponding PDU session, data should be transmitted to the AF 226 via the V-UPF 214 and the H-UPF 224. Therefore, in the case that the V-SMF 213 signals a PDU session configuration without V-CN-Tunnel Info, the H-SMF 223 may determine that the UE subscription information stored in the V-AMF 212 needs to be updated.

In the case that the H-SMF 223 determines that the UE subscription information in the V-AMF 212 needs to be updated, in step 640, in order to update the UE subscriber information stored in the V-AMF 212, the H-SMF 223 may transmit an NIDD update indication message to the UDM 227. Here, the NIDD update indication message may be information indicating that the UE subscriber information (SMF selection subscription data) stored in the V-AMF 212 and the subscriber information received from the UDM 227 are different from each other and/or a message notifying that the invoke NEF indication field of the SMF selection subscription data of the V-AMF 212 should be deleted or a deletion request message. Therefore, the NIDD update indication message may include both information of the V-AMF 212 and information of the corresponding CIoT UE.

When the UDM 227 receives the NIDD update indication message from the H-SMF 223, the UDM 227 may transmit a command instructing to delete the invoke NEF indication field through the Nudm_SDM_Notification message in order to update the SMF selection subscription data of the V-AMF 212 in step 650 based on the received NIDD update indication message.

Accordingly, the V-AMF 212 may receive a command instructing to delete the invoke NEF indication field among SMF selection subscription data from the UDM 227 in step 650. Therefore, the V-AMF 212 may delete the invoke NEF indication field stored in the memory at a registration timepoint of the CIoT UE 221.

Thereafter, the V-AMF 212 may transmit a message including an NIDD update indication to the V-SMF 213 in step 660. The message including the NIDD update indication transmitted from the V-AMF 212 to the V-SMF 213 may include information notifying (indicating) that data received from the CIoT UE 221 through the UPF is transmitted. Therefore, the V-SMF 213 may select the UPF based on the received message in step 660. In this case, the selected UPF may be an UPF appropriate for transmitting data received from the CIoT UE 221 to the HPLMN 220, as described above. That is, when UE subscriber information is updated in this way, the V-AMF 212 may transmit information including information indicating to select the UPF to the V-SMF 213 based on the updated information because the UE subscriber information of the corresponding CIoT UE 221 has been updated. Therefore, the V-SMF 213 may select again the UPF and transmit signaling or a message indicating the need for data transmission including V-CN-Tunnel Info to the H-SMF 223 based on the selected UPF. The subsequent operation may be performed according to the procedure for transmitting data of the CIoT UE 221 to the AF 226 through the UPF 224.

Figure 7:
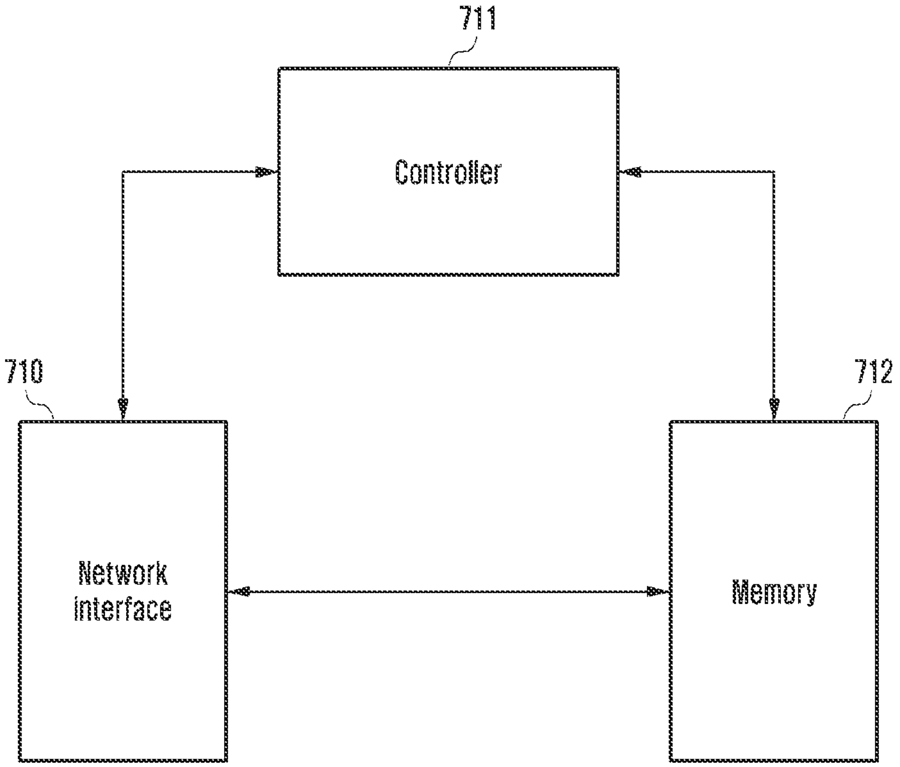
FIG. 7 is a functional block diagram illustrating a constitution of an NF according to an embodiment of the disclosure.

FIG. 7 is a functional block diagram illustrating a constitution of an NF according to an embodiment of the disclosure.

With reference to FIG. 7, the NF may include a network interface 710, a controller 711, and a memory 712. Further, although not illustrated in FIG. 7, the NF may further include other devices. For example, the NF may further include input and output devices for an operator and an interface.

The network interface 710 may perform transmission and reception of data/signals/signaling/messages with each network function described with reference to FIG. 1 and/or FIGS. 2 to 6. Accordingly, the network interface 710 may perform format conversion and/or interpretation for transmission of data/signals/signaling/messages to other network functions (NF).

The controller 711 may be implemented into at least one processor and perform processing for controlling an operation of each NF. For example, in the case that the NF is an AMF, the NF may perform not only the control of each operation of the AMF described in the 5G standard, but also the control for operations described in the disclosure. Further, in the case that the AF is an SMF, the NF may perform not only the control of each operation of the SMF described in the 5G standard, but also the control for operations described in the disclosure. Further, in the case that the AF is UDM, the NF may perform not only the control of each operation of UDM described in the 5G standard, but also the control for operations described in the disclosure.

The memory 712 may store control data required by the controller 711, data generated during the control, and various types of information described in the disclosure. Further, the memory 712 may store information received from the network interface 710. For example, in the case that the NF is an AMF, the memory 712 may store not only the control information for the operation of the AMF described in the 5G standard, but also information necessary for the control operation described in the disclosure. Further, in the case that the AF is an SMF, the memory 712 may store not only information for controlling the SMF described in the 5G standard, but also information necessary for the control operation described in the disclosure. Further, in the case that the AF is UDM, the memory 712 may store not only data for controlling each operation of UDM described in the 5G standard, but also information for the control described in the disclosure.

Embodiments disclosed in this specification and drawings described above only present specific examples to easily describe contents of the disclosure and to help understanding of the disclosure, and they are not intended to limit the scope of the disclosure. Therefore, in addition to the embodiments disclosed herein, all changes or modifications derived based on the technical idea of the disclosure should be interpreted as being included in the scope of the disclosure.

INDUSTRIAL APPLICABILITY

The disclosure may be used in the electronics industry and the information and communications industry.

The invention claimed is:

1. A method for a unified data management (UDM) of a wireless communication system to control transmission of a non-Internet protocol (non-IP) address data of a roaming terminal, the method comprising:

receiving, from an access and mobility management function (AMF) that has registered the roaming terminal in a visited public land mobile network (VPLMN), a subscriber information request message of the roaming terminal;

providing, to the AMF, subscriber information of the roaming terminal;

receiving, from a network exposure function (NEF) located in a home public land mobile network (HPLMN), a non-IP data delivery (NIDD) authorization request message including configuration information indicating whether NIDD of the roaming terminal passes through the NEF; and updating terminal subscriber information of the roaming terminal based on the received NIDD authorization request message, wherein the terminal subscriber information comprises a session management subscription data and a session management function (SMF) selection subscription data.

2. The method of claim 1, further comprising transmitting an update indication message for updating the subscriber information based on the terminal subscriber information from the VPLMN to the AMF that has registered the roaming terminal.

3. The method of claim 2, wherein the update indication message is configured to indicate addition or deletion of an invoke NEF indication field included in the SMF selection subscription data.

4. The method of claim 3, wherein the invoke NEF indication field is configured to indicate that the non-IP address data is transmitted through an SMF.

5. The method of claim 1, further comprising transmitting an update indication message for updating the subscriber information to an SMF of the HPLMN based on the terminal subscriber information.

6. The method of claim 5, wherein the update indication message is configured to indicate addition or deletion of an NEF identity for an NIDD field included in the session management subscription data.

7. The method of claim 6, wherein the NEF identity for the NIDD field is configured to indicate that the non-IP address data is transmitted through an SMF.

8. The method of claim 1, further comprising:

providing, when the subscriber information of the roaming terminal is requested from an SMF of the HPLMN, the terminal subscriber information of the roaming terminal; and transmitting, when an NIDD update indication message is received from the SMF of the HPLMN, an update indication message for updating subscriber information based on the terminal subscriber information to the AMF of the VPLMN.

9. The method of claim 8, wherein the NIDD update indication message comprises information of the AMF and information of the roaming terminal.

10. The method of claim 8, wherein the update indication message is configured to indicate addition or deletion of an invoke NEF indication field included in the SMF selection subscription data.

11. The UDM device of claim 1, wherein the at least one processor is further configured to:

provide, when the subscriber information of the roaming terminal is requested from an SMF of the HPLMN, the terminal subscriber information of the roaming terminal; and transmit, when an NIDD update indication message is received from the SMF of the HPLMN, an update indication message for updating subscriber information based on the terminal subscriber information to the AMF of the VPLMN.

12. The UDM device of claim 11, wherein the NIDD update indication message comprises information of the AMF and information of the roaming terminal.

13. The UDM device of claim 11, wherein the update indication message is configured to indicate addition or deletion of an invoke NEF indication field included in the SMF selection subscription data.

14. A unified data management (UDM) device for controlling transmission of non-Internet protocol (non-IP) address data of a roaming terminal in a wireless communication system, the UDM device comprising:

a network interface configured to communicate with other network functional devices;

a memory configured to store terminal information; and at least one processor, wherein the at least one processor is configured to:

receive, from an access and mobility management function (AMF) that has registered the roaming terminal in a visited public land mobile network (VPLMN), a subscriber information request message of the roaming terminal, provide subscriber information of the roaming terminal to the AMF, receive, from a network exposure function (NEF) located in a home public land mobile network (HPLMN), a non-IP data delivery (NIDD) authorization request message including configuration information indicating whether NIDD of the roaming terminal passes through the NEF, and update terminal subscriber information of the roaming terminal based on the received NIDD authorization request message, wherein the terminal subscriber information comprises a session management subscription data and a session management function (SMF) selection subscription data.

15. The UDM device of claim 14, wherein the at least one processor is configured to further control to transmit an update indication message for updating the subscriber information based on the terminal subscriber information from the VPLMN to the AMF that has registered the roaming terminal.

16. The UDM device of claim 15, wherein the update indication message is configured to indicate addition or deletion of an invoke NEF indication field included in SMF selection subscription data.

17. The UDM device of claim 16, wherein the invoke NEF indication field is configured to indicate that the non-IP address data is transmitted through an SMF.

18. The UDM device of claim 14, wherein the at least one processor is configured to further control to transmit an update indication message for updating the subscriber information to an SMF of the HPLMN, based on the terminal subscriber information.

19. The UDM device of claim 18, wherein the update indication message is configured to indicate addition or deletion of an NEF identity for an NIDD field included in the session management subscription data.

20. The UDM device of claim 19, wherein the NEF identity for the NIDD field is configured to indicate that the non-IP address data is transmitted through an SMF.

* * * * *